(12) United States Patent
Kim et al.

(10) Patent No.: US 10,884,178 B2
(45) Date of Patent: Jan. 5, 2021

(54) BACKLIGHT UNIT AND LIQUID CRYSTAL DISPLAY DEVICE HAVING A BACKLIGHT UNIT

(71) Applicant: LG Display Co., Ltd., Seoul (KR)

(72) Inventors: Jinho Kim, Paju-si (KR); ChangKyeong Kong, Gympo-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/716,227

(22) Filed: Sep. 26, 2017

(65) Prior Publication Data

US 2018/0149800 A1    May 31, 2018

(30) Foreign Application Priority Data

Nov. 30, 2016    (KR) .................. 10-2016-0161854

(51) Int. Cl.
    *F21V 8/00*    (2006.01)
(52) U.S. Cl.
    CPC .......... *G02B 6/0055* (2013.01); *G02B 6/0088* (2013.01)
(58) Field of Classification Search
    CPC ................ G02B 6/0088; G02B 6/0055; G02F 1/133615; G02F 1/1336
    See application file for complete search history.

(56) References Cited

U.S. PATENT DOCUMENTS

| | | | | |
|---|---|---|---|---|
| 2014/0002768 A1* | 1/2014 | Kuo | .................. | G02F 1/133512 349/60 |
| 2014/0085564 A1* | 3/2014 | Hendren | ........... | G02F 1/133385 349/58 |
| 2014/0111975 A1* | 4/2014 | Wu | ...................... | G02B 6/0045 362/97.1 |
| 2014/0204607 A1* | 7/2014 | Yan | ...................... | G02B 6/0031 362/606 |
| 2015/0316710 A1* | 11/2015 | Liu | ...................... | G02B 6/0088 362/615 |

(Continued)

FOREIGN PATENT DOCUMENTS

| | | |
|---|---|---|
| CN | 102155692 A | 8/2011 |
| CN | 103499068 A | 1/2014 |

(Continued)

OTHER PUBLICATIONS

Yanping, et al., "The Display Principle and Design of Thin Film Transistor Liquid Crystal Display," Publishing House of Electronics Industry, 2016, pp. 7.

*Primary Examiner* — Michael H Caley
*Assistant Examiner* — Mariam Qureshi
(74) *Attorney, Agent, or Firm* — Seed IP Law Group LLP

(57) ABSTRACT

The present disclosure relates to a backlight unit and a liquid crystal display device having a backlight unit. The backlight unit includes a light guide plate, a light source assembly positioned adjacent to a light-incident surface among lateral surfaces of the light guide plate, and an external tape covering the entire lateral surface of the light guide plate except the light-incident surface and parts of an upper surface and a lower surface of the light guide plate. Thus, the light efficiency of the backlight unit may be increased and the manufacturing costs reduced. Further, since the light efficiency of the backlight unit is increased, the luminance and power consumption of the liquid crystal display device can be improved.

14 Claims, 7 Drawing Sheets

(56) References Cited

U.S. PATENT DOCUMENTS

| | | | |
|---|---|---|---|
| 2016/0109641 A1* | 4/2016 | Yeom | G02B 6/0055 362/606 |
| 2016/0131831 A1* | 5/2016 | Tomomasa | G02B 6/0031 348/790 |
| 2016/0170130 A1* | 6/2016 | Jin | G02B 6/0055 349/65 |
| 2017/0045676 A1* | 2/2017 | Zhou | G02B 6/0023 |
| 2017/0176663 A1* | 6/2017 | Furuta | G02B 6/002 |
| 2017/0227705 A1* | 8/2017 | Araki | G02B 6/0043 |
| 2017/0261678 A1* | 9/2017 | He | G02B 6/0055 |
| 2018/0313997 A1* | 11/2018 | Murata | G02B 6/0025 |

FOREIGN PATENT DOCUMENTS

| | | |
|---|---|---|
| CN | 103982868 A | 8/2014 |
| CN | 104654133 A | 5/2015 |
| CN | 104791660 A | 7/2015 |
| CN | 105116605 A | 12/2015 |
| CN | 106471422 A | 3/2017 |
| KR | 10-2016-0034481 A | 3/2016 |

\* cited by examiner

BACKLIGHT UNIT AND LIQUID CRYSTAL DISPLAY DEVICE HAVING A BACKLIGHT UNIT

CROSS-REFERENCE TO RELATED APPLICATIONS

This application claims priority from Korean Patent Application No. 10-2016-0161854, filed Nov. 30, 2016, which is hereby incorporated by reference for all purposes as if fully set forth herein.

BACKGROUND

Technical Field

The present disclosure relates to a backlight unit and a liquid crystal display device having a backlight unit.

Description of the Related Art

With the progress of the information-oriented society, various types of demands for display devices for displaying an image are increasing. Recently, various types of display devices such as a liquid crystal display (LCD) device, a plasma display panel device, and an organic light emitting diode (OLED) device have been used.

Among these flat panel display devices, an LCD device includes a liquid crystal panel in which a liquid crystal is injected between a thin film transistor substrate and a color filter substrate. The LCD device is a non-emissive element and thus includes a backlight unit for supplying light on a back surface of the thin film transistor substrate. The transmittance of light irradiated from the backlight unit is controlled depending on an alignment state of liquid crystals.

Backlight units can be divided into a direct-type backlight unit and an edge-type backlight unit depending on a position of a light source. The edge-type backlight unit has a structure in which a light source is positioned on a lateral surface of a light guide plate and has usually been applied to relatively small liquid crystal display devices such as laptop and notebook computers. The edge-type backlight unit has excellent light uniformity and a long durable life and is advantageous for thinning of an LCD device.

The backlight unit using a light guide plate goes through a plurality of resin processes in order to increase the bonding strength between the light guide plate and its surrounding components. However, light may be leaked due to resins used in the above-described resin processes, which may cause a decrease in light efficiency.

Further, the resins used in the plurality of resin processes may cause an increase in manufacturing costs, and a bezel area may be increased to shield an area where the resins are used.

BRIEF SUMMARY

Briefly stated, embodiments described herein are directed towards a backlight unit that includes an external tape covering a lateral part of a light guide plate. The placement of the external tape increases the light efficiency and reduces manufacturing costs of the backlight unit.

In some embodiments, by using the external tape to cover the lateral parts of the light guide plate, the luminance and power consumption can be improved and the bonding strength between the components can be enhanced.

In another embodiment, a liquid crystal display device improves the luminance and power consumption by using an external tape to cover a lateral part of a light guide plate.

Still another embodiment is directed towards a backlight unit including: a light guide plate; a light source assembly positioned adjacent to a light-incident surface among lateral surfaces of the light guide plate; and an external tape covering the lateral surfaces of the light guide plate except the light-incident surface and parts of an upper surface and a lower surface of the light guide plate.

The external tape may include a reflective layer and a color coat layer positioned on the reflective layer.

The external tape may be independently positioned corresponding to each lateral surface except the light-incident surface.

In some embodiments, the reflective layer may be formed of at least any one of silver (Ag), aluminum (Al), titanium (Ti) and mixtures thereof.

Additionally, the backlight unit may further include a glass cover that interfaces with the light guide plate, and the glass cover may include a black print layer positioned on a surface facing the light guide plate and a reflector positioned on the black print layer.

Furthermore, the backlight unit may further include a black cover layer that covers a lateral surface of the glass cover adjacent to the light source assembly and parts of an upper surface and a lower surface of the glass cover.

In some embodiments, the backlight unit may further include a reflective tape positioned between the light guide plate and the black cover layer, reflective tape overlapping with the black cover layer.

Further, the backlight unit may further include an adhesive member positioned between the light guide plate and the glass cover. The adhesive member may overlap with the external tape that covers a part of the lower surface of the light guide plate.

Furthermore, the adhesive member and the external tape that covers covering a part of the lower surface of the light guide plate may be a thickness between 1 mm and 3 mm.

According to another embodiment, a liquid crystal display device includes: a backlight unit having a light guide plate, a light source assembly positioned adjacent to a light-incident surface among lateral surfaces of the light guide plate, and an external tape covering the lateral surfaces of the light guide plate except the light-incident surface and parts of an upper surface and a lower surface of the light guide plate; and a liquid crystal panel positioned on the backlight unit.

The external tape may include a reflective layer and a color coat layer positioned on the reflective layer.

The liquid crystal display device may further include an adhesive member positioned between the light guide plate and the liquid crystal panel. The adhesive member may be positioned to overlap with the external tape that covers a part of the upper surface of the light guide plate.

The liquid crystal display device may further include a shielding member positioned on an edge of the upper surface adjacent to the light-incident surface of the light guide plate.

The liquid crystal display device may further include a top cover that covers a lateral surface of the backlight unit at the light source assembly and an edge of an upper surface of the liquid crystal panel that overlaps with the light source assembly.

Details of other embodiments will be included in the detailed description and the accompanying drawings.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
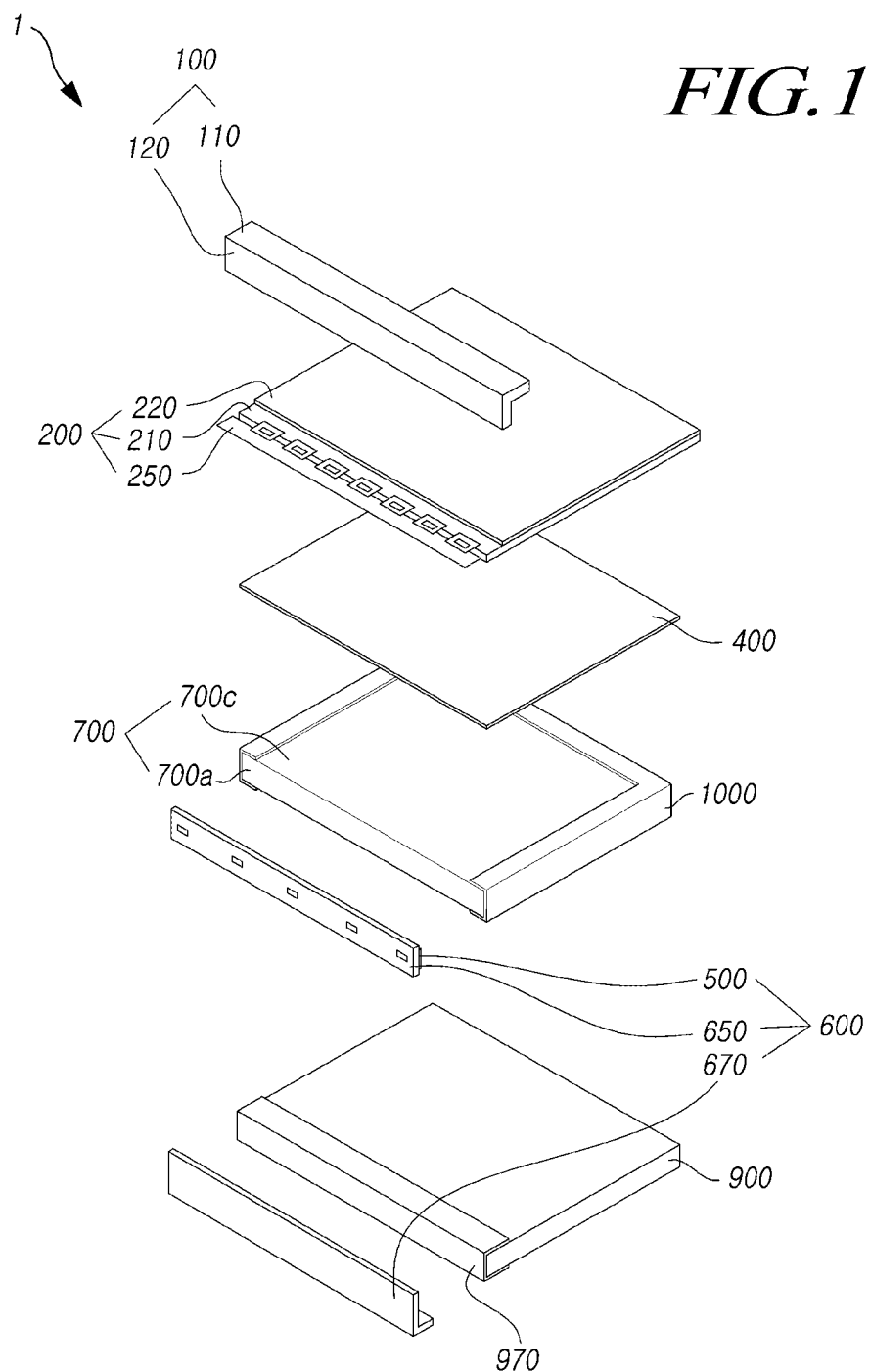
FIG. 1 is an exploded perspective view schematically illustrating a backlight unit and a liquid crystal display device having a backlight unit according to at least one embodiment of the present disclosure.

Hereinafter, some embodiments of the present disclosure will be described in detail with reference to the accompanying drawings. When reference numerals refer to components of each drawing, although the same components are illustrated in different drawings, the same components are referred to by the same reference numerals as possible.

Further, in describing components of the present disclosure, terms such as first, second, A, B, (a), and (b) can be used. These terms are used only to differentiate the components from other components. Therefore, the nature, order, sequence, or number of the corresponding components is not limited by these terms. It is to be understood that when one element is referred to as being "connected to" or "coupled to" another element, it may be directly connected to or directly coupled to another element, connected to or coupled to another element, having still another element "intervening" therebetween, or "connected to" or "coupled to" another element via still another element.

Hereinafter, some embodiments of the present disclosure will be described with reference to the accompanying drawings.

Figure 2:
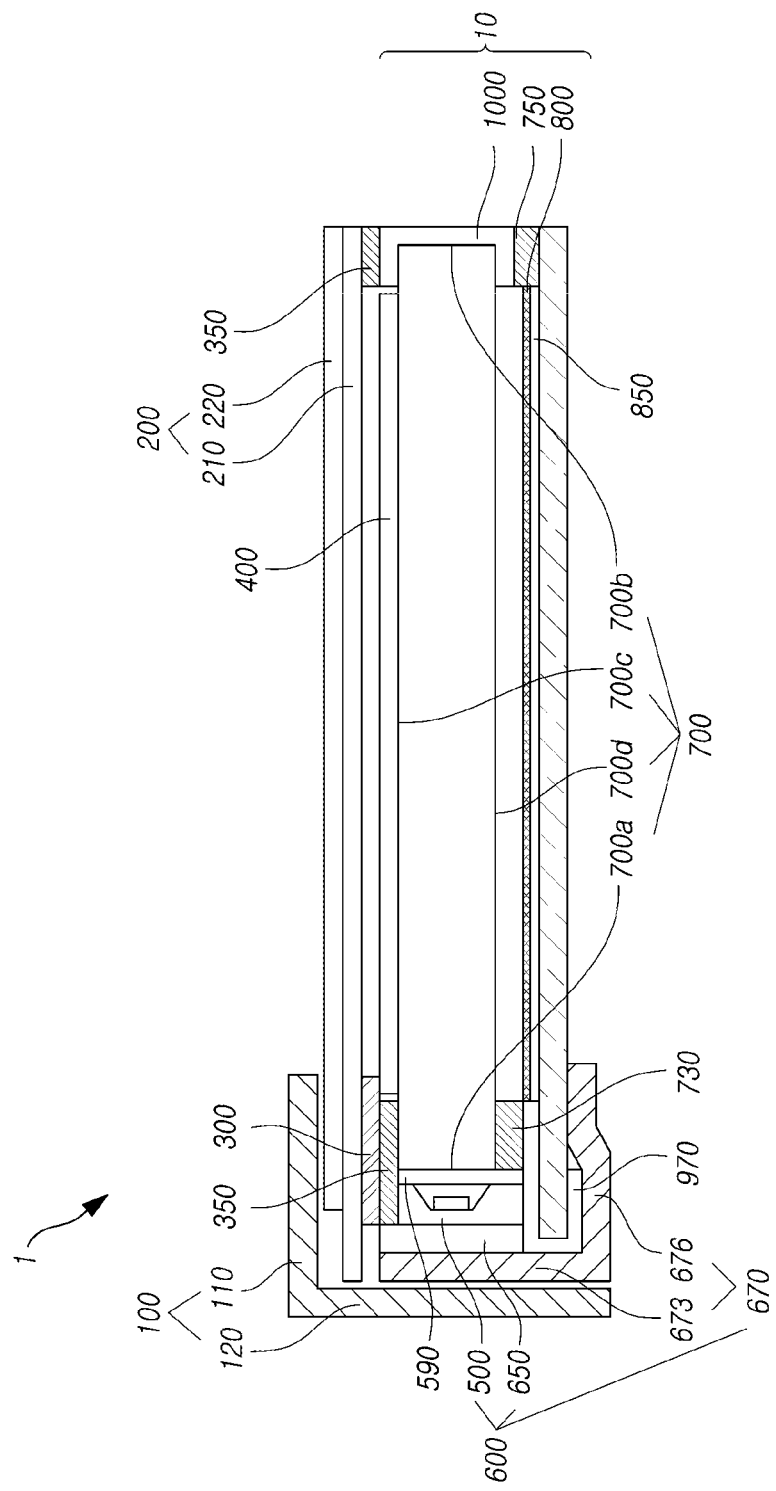
FIG. 2 is a cross-sectional view obtained by cutting the backlight unit and the liquid crystal display device having a backlight unit in a first direction.
Figure 3:
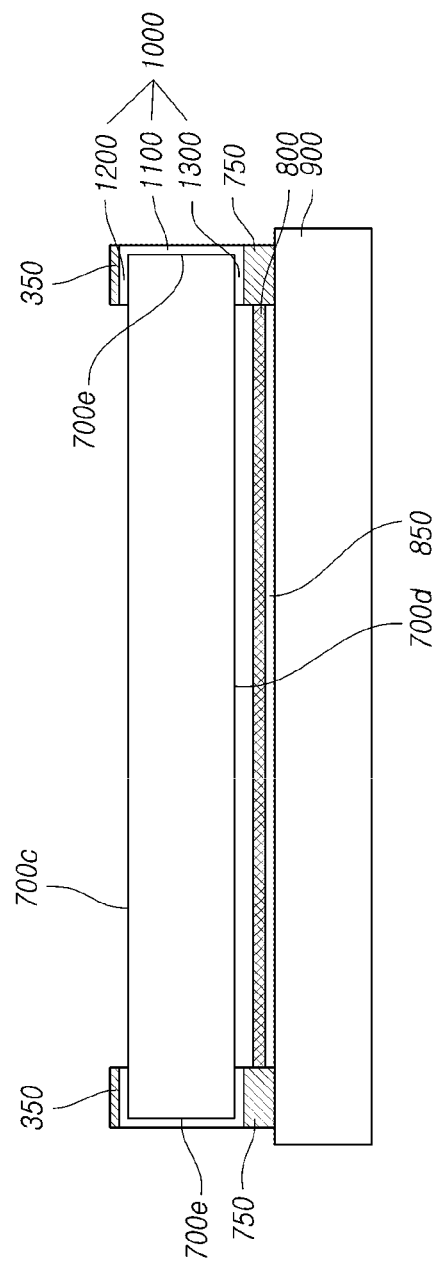
FIG. 3 is a cross-sectional view obtained by cutting the backlight unit and the liquid crystal display device having a backlight unit in a second direction.

FIG. 1 is an exploded perspective view schematically illustrating a backlight unit and a liquid crystal display device having a backlight unit according to at least one embodiment of the present disclosure, FIG. 2 is a cross-sectional view obtained by cutting the backlight unit and the liquid crystal display device having a backlight unit in a first direction, and FIG. 3 is a cross-sectional view obtained by cutting the backlight unit and the liquid crystal display device having a backlight unit in a second direction.

Referring to FIG. 1 through FIG. 3, a liquid crystal display device 1 according to at least one embodiment of the present disclosure may include a liquid crystal panel 200, a backlight unit 10, and a top cover 100. The liquid crystal panel 200 may receive light from the backlight unit 10 and control alignment of liquid crystals refracted in different patterns and thus display an image.

The liquid crystal panel 200 may include a first substrate 210 on which a thin film transistor is formed, a second substrate 220 on which a color filter is formed and which faces the thin film transistor substrate 210, and a liquid crystal layer (not illustrated) interposed between the first substrate 210 and the second substrate 220.

The liquid crystal display device 1 may further include a driver 250 configured to control alignment of liquid crystals in the liquid crystal layer. The driver 250 may include a flexible printed circuit board (FPC), a driving chip mounted on the flexible printed circuit board, and a circuit board (PCB) connected to the other side of the flexible printed circuit board.

The driver 250 may be a chip on film (COF) type, and may employ other types such as a tape carrier package (TCP) type or a chip on glass (COG) type known in the art. Further, a part or the whole of the driver 250 can be mounted on the first substrate 210 on which the thin film transistor is formed.

The top cover 100 may include a horizontal part 110 covering an edge of the liquid crystal panel 200 and a top cover sidewall 120 downwardly bent from the horizontal part 110. Herein, the top cover sidewall 120 may cover a light source housing 670 and the horizontal part 110 may cover the driver 250 positioned thereunder. The driver 250 is configured to drive the liquid crystal panel 200 but cannot display an image. Therefore, the driver 250 needs to be covered by the horizontal part 110 for appearance.

Further, the driver 250 may be positioned to overlap with an area at a light source assembly 600.

In the area where the light source assembly 600 is positioned, no external tape 1000 is positioned. Thus, in the area where the light source assembly 600 is positioned, a black cover layer 970 and a shielding member 300 for shielding light supplied from the light source assembly 600 are positioned and light is shielded. The driver 250 is configured to drive the liquid crystal panel 200 but cannot display an image. That is, an area where the driver 250 and the light source assembly 600 are located needs to be shielded against light.

Otherwise stated, if the driver 250 and the light source assembly 600 are not in an overlapping position with each other, the area of the top cover 100 may be increased to shield the area for the driver 250 and the light source assembly 600 against light. Thus, a bezel area may be increased and an active area may be proportionally reduced.

Accordingly, the driver 250 and the light source assembly 600 are positioned to overlap with each other and be covered by the horizontal part 110. Thus, the bezel area can be minimized and the active area can be increased. As described above, the liquid crystal panel 200 except the area covered by the horizontal part 110 of the top cover 100 serves as an active area where an image is displayed. The top cover 100 is opened to expose the active area.

The backlight unit 10 may be located in back of the liquid crystal panel 200. The backlight unit 10 is a device configured to convert a dot light source or a linear light source into a planar light source.

The backlight unit 10 may include a light guide plate 700, an optical member 400, the light source assembly 600, a glass cover 900, the light source housing 670, and the external tape 1000.

The glass cover 900 may be formed into a flat panel. The glass cover 900 may be formed of a transparent material such as glass, quartz, quartz glass, and tempered glass. As described above, the glass cover 900 formed of a transparent material can improve the field of view of the liquid crystal display device 1.

Further, a reflector 800 may be positioned between the light guide plate 700 and the glass cover 900. The reflector 800 may be positioned on one surface of the glass cover 900 facing the light guide plate 700. Furthermore, a black print layer 850 may be positioned between the one surface of the glass cover 900 and the reflector 800.

Meanwhile, a black cover layer 970 covering a lateral surface of the glass cover 900 and parts of an upper surface and a lower surface of the glass cover 900 may be positioned on one side of the glass cover 900. Herein, the one side of the glass cover 900 may be adjacent to the light source assembly 600.

The reflector 800 may be positioned under the light source assembly 600 and configured to guide light leaked to a lower side of the light source assembly 600 toward the liquid crystal panel 200. The reflector 800 can increase the light efficiency by reflecting light leaked to a lower side of the light guide plate 700 toward the liquid crystal panel 200.

The reflector 800 may be formed on one surface of the glass cover 900 by spraying, printing, bonding, or the like. For example, if the reflector 800 is bonded to the glass cover 900, the reflector 800 may be formed of a reflective material such as a plastic material or a metal having reflectivity. If the reflector 800 is printed on the surface of the glass cover 900, a paste including a metal having a high reflectivity may be printed on the surface of the glass cover 900.

The black print layer 850 is positioned on one surface of the glass cover and may be positioned between the reflector 800 and the glass cover 900. Since the glass cover 900 is formed of glass, light may be leaked into the glass. Thus, the black print layer 850 is positioned on the one surface of the glass cover 900. Thus, light leaked is shielded into the glass cover 900, thereby increasing the light efficiency. The black print layer 850 may be formed of a material, such as carbon black, and chromium oxide, capable of absorbing light.

The black cover layer 970 may be positioned adjacent to the light source assembly 600. The black cover layer 970 may be positioned to cover a lateral surface of the glass cover 900 and parts of the upper surface and the lower surface of the glass cover 900.

The black cover layer 970 may be positioned to cover the black print layer 850 and the reflector 800 positioned on the one surface of the glass cover 900. According to the at least one embodiment, the black cover layer 970 may be positioned on a surface of the glass cover 900 where the black print layer 850 and the reflector 800 are not formed.

Herein, the black cover layer 970 may be positioned in close contact with the light source housing 670 or the circuit board 650 along a shape of the glass cover 900 or the circuit board 650. Otherwise, the black cover layer 970 may be positioned in separation from the light source housing 670. In the present embodiment, the black cover layer 970 is positioned in close contact with the light source housing 670. The black cover layer 970 may be positioned under the light source assembly 600 and thus can suppress penetration of light from the light source assembly 600 into the glass cover 900.

A reflective tape 730 may be positioned on the glass cover 900. Specifically, one surface of the reflective tape 730 may be positioned in contact with a reflective surface 700d of the light guide plate 700 and the other surface opposite to the one surface may be positioned in contact with one surface of the black cover layer 970. The reflective tape 730 may be positioned on an area of the reflective surface 700d of the light guide plate 700 adjacent to a light-incident surface 700a.

In the present embodiment, the other surface of the reflective tape 730 is in contact with the one surface of the black cover layer 970. However, the other surface of the reflective tape 730 may be in contact with the glass cover 900 or the black print layer 850.

If the reflective tape 730 is in contact with the surface of the reflector, the reflector 800 may have a smooth surface to serve as a reflective surface. Thus, the adhesive strength may be decreased, which may cause peeling.

A second adhesive member 750 bonds the light guide plate 700 and the glass cover 900 may be positioned between the glass cover 900 and the light guide plate 700. Further, a first adhesive member 350 may be positioned between the light guide plate 700 and the liquid crystal panel 200. The relationship among the first adhesive member 350, the second adhesive member 750, the light guide plate 700, and the external tape 1000 is described in detail with reference to the accompanying drawings.

The light source assembly 600 may be positioned on one side of the glass cover 900 along an edge of the glass cover 900. The light source assembly 600 may include a light source package 500 including a light source, the circuit board 650, and the light source housing 670.

The light source package 500 may include a light source, a mold that interfaces with the light source, and a molding member that encapsulates the mold.

The light source may be a fluorescent lamp, a light emitting element, or the like. The light emitting element may use a light emitting diode (LED), an inorganic Electroluminescence (EL), an organic EL, or the like. In the present embodiment, for example, the LED is the light source.

The mold may include an indentation as a space for accommodating the light source in its front surface. The light source may be positioned in the indentation. Since the light source is positioned in the indentation of the mold, light can be emitted toward the front of the mold.

The indentation may be filled with the molding member. The molding member may protect the light source against the external environment. The molding member may include a phosphorescent or fluorescent material. Therefore, the light source package 500 can emit a desired color to the outside by allowing light emitted from the light source to pass through the molding member.

For example, the light source package 500 may emit a white light by setting a color of light emitted from the light source to be complementary to a phosphorescent or fluorescent from the molding member 570. As another example, a red LED, a green LED, and a blue LED may be employed, and the colors of lights emitted from the respective LEDs may be mixed to provide a white light.

The light source package 500 may be supported/fixed to the circuit board 650. The circuit board 650 may be positioned on a sidewall of the light source housing 670. The light source housing 670 includes a light source housing sidewall 673 on which the circuit board 650 is seated and a light source housing bottom 676 bent from an end of the light source housing sidewall 673 and covering the lower surface of the glass cover 900. Herein, the lower surface of the glass cover 900 refers to a surface of the glass cover 900 facing the surface on which the reflector 800 is positioned and may serve as an external surface of the backlight unit 10.

In at least one embodiment, the light source housing bottom 676 covers only a part of the lower surface of the glass cover 900. However, the other embodiments are not limited thereto. The light source housing bottom 676 may be positioned to cover the entire lower surface of the glass cover 900.

Specifically, the circuit board 650 may be positioned on one side of the glass cover 900 along an edge of the glass cover 900. For example, the circuit board 650 may include a mounting surface on which the light source package 500 is mounted, a seating surface positioned to face the mounting surface, and a circuit board lateral surface formed by connecting ends of the mounting surface and the seating surface.

As defined herein, the mounting surface of the circuit board 650 refers to a surface on which the light source package 500 is mounted and the seating surface refers to a surface on which the light source housing 670 is seated. Further, the circuit board lateral surface may be a thickness surface of the circuit board 650.

By adjusting the thickness of the circuit board lateral surface, a distance between the light source package 500 and the light-incident surface 700a of the light guide plate 700 can be adjusted. By adjusting the distance, a collision between the light guide plate 700 and the light source package 500 may be suppressed. Further, by adjusting the distance between the light source and the light guide plate 700, the amount of light incident into the light guide plate 700 may be adjusted. Otherwise stated, by adjusting the distance between the light source and the light-incident surface 700a of the light guide plate 700 using the circuit board 650, the number of light sources, and the light uniformity having a trade-off relationship with each other can be controlled appropriately.

Also, a gap filler 590 configured to suppress the reflection of light emitted from the light source package 500 may be further positioned between the light-incident surface 700a of the light guide plate 700 and the light source package 500. The gap filler 590 can minimize the amount of light reflected by using a material having a similar refractivity to the light guide plate 700.

Referring again to FIG. 1 through FIG. 3, the circuit board 650 may be mounted on the light source housing 670. Thus, a front surface of the light source package 500 may be positioned to face the light-incident surface 700a of the light guide plate 700.

The light guide plate 700, which induces light supplied from the light source assembly 600 to the liquid crystal panel 200, may be positioned in back of the liquid crystal panel 200. Specifically, the light guide plate 700 may be positioned between the liquid crystal panel 200 and the reflector 800.

The light guide plate 700 may include the light-incident surface 700a provided on a lateral end surface in order for light emitted from the light source assembly 600 to be incident thereto, a counter light-incident surface 700b facing the light-incident surface 700a, a light-emitting surface 700c positioned on an upper surface facing the liquid crystal panel 200, and a reflective surface 700d positioned on the other side of the light-emitting surface 700c on the upper surface and positioned on a lower surface facing the reflector 800. Further, the light guide plate 700 may include a lateral surface 700e connecting the light-incident surface 700a and the counter light-incident surface 700b or the light-emitting surface 700c and the reflective surface 700d.

Herein, the first direction in FIG. 2 refers to the direction of cutting the counter light-incident surface 700b from the light-incident surface 700a of the light guide plate 700, and the second direction in FIG. 3 refers to the direction of cutting a second lateral surface 700e from a first lateral surface 700e of the light guide plate 700.

The light supplied from the light source assembly 600 may be supplied to the liquid crystal panel 200 through the light-emitting surface 700c on the upper surface of the light guide plate 700. Further, the counter light-incident surface 700b may be positioned facing the light-incident surface 700a. A plurality of scattering patterns (not illustrated) configured to reflect light toward the light-emitting surface 700c of the light guide plate 700 may be positioned on the counter light-incident surface 700b and the reflective surface 700d of the light guide plate 700. The scattering patterns can change a light path in order for light staying within the light guide plate 700 to be scattered and emitted toward the light-emitting surface 700c of the light guide plate 700.

As described above, the light guide plate 700 may be formed of a material including permeable glass, quartz, or polymer to efficiently guide light. The polymer may include a material having a predetermined refractivity such as acryl resin, for example, polymethylmethacrylate (PMMA) or polycarbonate (PC).

The light source assembly 600 may be positioned in parallel to the light-incident surface 700a of the light guide plate 700. The light source assembly 600 may be positioned in various ways depending on a shape of the light guide plate 700. For example, if the light guide plate 700 is of an edge type and the light-incident surface 700a is defined on only one lateral surface of the light guide plate 700, the light source assembly 600 may be positioned on only one side.

Further, if the light guide plate 700 is of flat panel type in which the light-incident surface 700a of the light guide plate 700 is defined on both surfaces, the light source assembly 600 may be positioned on both left and right sides of the light-incident surface 700a. Otherwise, as illustrated in the embodiment presented in FIGS. 1-3, the light source assembly 600 may be positioned on only one surface of the light guide plate 700 of flat panel type.

Meanwhile, the backlight unit 10 and the liquid crystal display device 1 having a backlight unit may include the external tape 1000 that covers the entire counter light-incident surface 700b and lateral surface 700e of the light guide plate 700 and parts of the light-emitting surface 700c and the reflective surface 700d.

The external tape 1000 is positioned on a part of the reflective surface 700d. Notably, the external tape 1000 positioned on a part of the light-emitting surface 700c may have the same size or different sizes. As such, the external tapes 1000 having the same or different shapes can be adjusted with respect to the adhesive areas of the adhesive members. Thus, the size of the bezel area can be freely adjusted and the adhesive strength can be improved.

Conventionally, the second adhesive member 750 is positioned between the light guide plate 700 and the glass cover 900 to bond these two components, and the first adhesive member 350 is positioned between the light guide plate 700 and the liquid crystal panel 200 to bond these two components.

In this embodiment, the first adhesive member 350 and the second adhesive member 750 are formed of resins for bonding and thus are not light shielding members. Therefore, light may be leaked between the first adhesive member 350 and the second adhesive member 750, which may cause a decrease in light efficiency. In order to solve the above-described problem, a side-sealing process of providing a light shielding material on the lateral surface of the light guide plate 700 on which the first adhesive member 350 and the second adhesive member 750 are positioned is performed to suppress light leakage.

However, in such an embodiment, the side-sealing material serving as a light shielding material may cause an increase in bezel area, and since the side-sealing material is positioned in an area for bonding the light guide plate 700 and the liquid crystal panel 200 and for bonding the light guide plate 700 and the glass cover 900, manufacturing costs may be increased. Additionally, since the side-sealing material is bonded to the counter light-incident surface 700b and the lateral surface 700e of the light guide plate 700, light staying within the light guide plate 700 may be absorbed to the side-sealing material. Thus, the side-sealing material may cause a decrease in light efficiency.

Further, if the liquid crystal panel 200 is positioned on the light guide plate 700 using a guide cover, the amount to which that bezel area may by reduced is limited due to the guide cover. Further, a resin for bonding the glass cover 900 and the guide cover is used therebetween, which may increase manufacturing costs. Furthermore, light may be leaked through the resin for bonding, which may cause a decrease in light efficiency.

However, the backlight unit 10 and the liquid crystal display device 1 having a backlight unit, according to the at least one embodiment, solves the technical problems of the bonding method using the side-sealing material and the guide cover. Accordingly, the light efficiency of the backlight unit 10 may be increased and the manufacturing costs reduced by having the external tape 1000 cover a lateral part of the light guide plate 700. Further, the bezel area may be reduced and the light efficiency of the backlight unit 10 may be increased by using the external tape 1000, improving the luminance and power consumption of the liquid crystal display device 1.

The structure and function of the external tape 1000 is described later in detail.

Meanwhile, the optical member 400 may be positioned between the light-emitting surface 700c of the light guide plate 700 and the liquid crystal panel 200. The optical member 400 may include a protective film, a condensing film, a diffusion film, and the like.

The diffusion film may function to diffuse light supplied from the light source assembly 600 and then supply the diffused light to the liquid crystal panel 200. The diffusion film may scatter/diffuse light to suppress projection of a bright portion/dark portion present in the backlight unit 10 in back of the liquid crystal panel 200 onto the liquid crystal panel 200.

The condensing film may function to condense the light diffused by the diffusion film in a direction perpendicular to the plane of the liquid crystal panel 200 above the condensing film. In the condensing film, trigonal prism patterns may be uniformly formed on an upper surface. Typically, two sheets of condensing film are used, and the condensing films may be positioned in order for micro prism patterns to be orthogonal to each other. Almost all of the light passing through the condensing films travels vertically and thus may provide a uniform luminance.

The protective film which is the uppermost film of the optical film 400 and can protect the micro prism patterns of the condensing film sensitive to scratch such as dust may be positioned on the condensing film.

Meanwhile, the first adhesive member 350 may be positioned between the liquid crystal panel 200 and the light guide plate 700. Further, the second adhesive member 750 may be positioned between the light guide plate 700 and the glass cover 900.

The first adhesive member 350 and the second adhesive member 750 may be positioned on the external tape 1000 so as to be partially or fully overlapped with the external tape 1000. Therefore, the first adhesive member 350 and the second adhesive member 750 are hidden by the external tape 1000. Accordingly, the size of the active area can be increased. That is, the size of the bezel area of the liquid crystal display device 1 can be reduced.

Further, the light guide plate and its surrounding components are bonded through the first adhesive member 350 and the second adhesive member 750, thereby enhancing the bonding strength between the components.

As such, in the backlight unit 10 and the liquid crystal display device 1 having a backlight unit according to the present embodiment, the light efficiency of the backlight unit 10 may be increased and the manufacturing costs may be reduced by using the external tape 1000 covering a lateral part of the light guide plate 700. Further, the bezel area may be reduced and the light efficiency of the backlight unit 10 may be increased by using the external tape 1000. Accordingly, the luminance and power consumption of the liquid crystal display device 1 may be improved.

Hereinafter, the external tape 1000 of the backlight unit 10 is described in detail.

Figure 4:
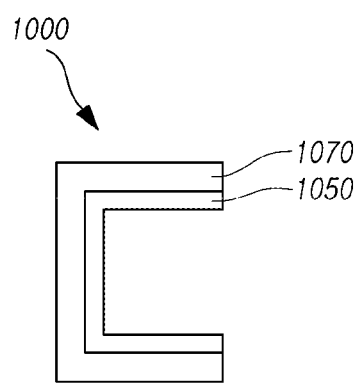
FIG. 4 is a cross-sectional view illustrating an external tape according to at least one embodiment of the present disclosure.
Figure 5:
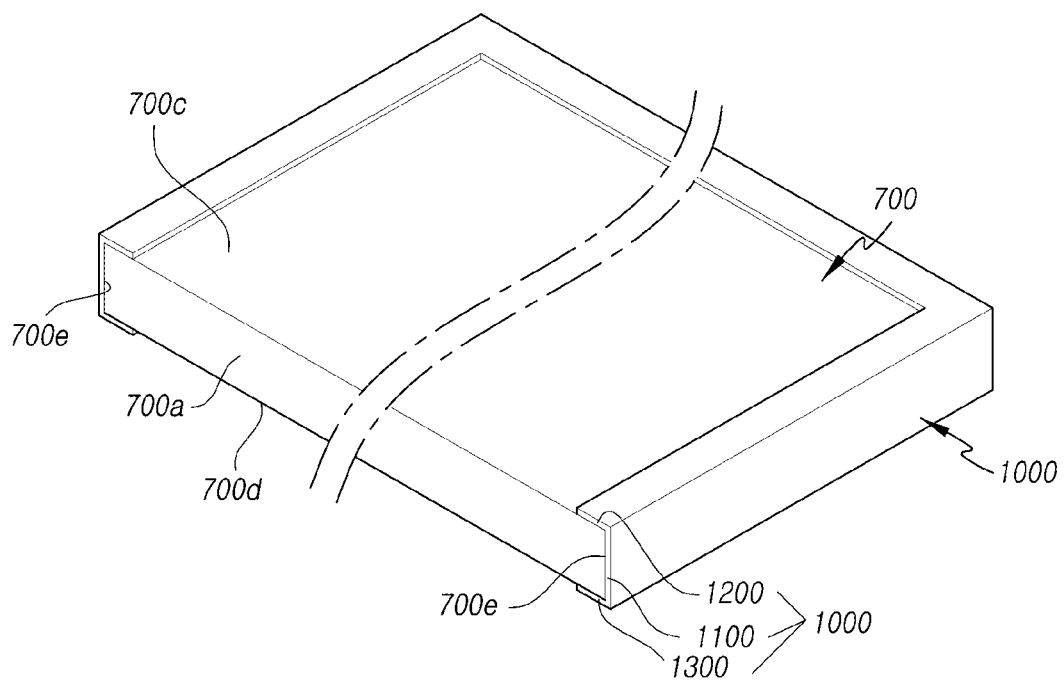
FIG. 5 is a perspective view illustrating the connection relationship between a light guide plate and an external tape according to at least one embodiment of the present disclosure.
Figure 6:
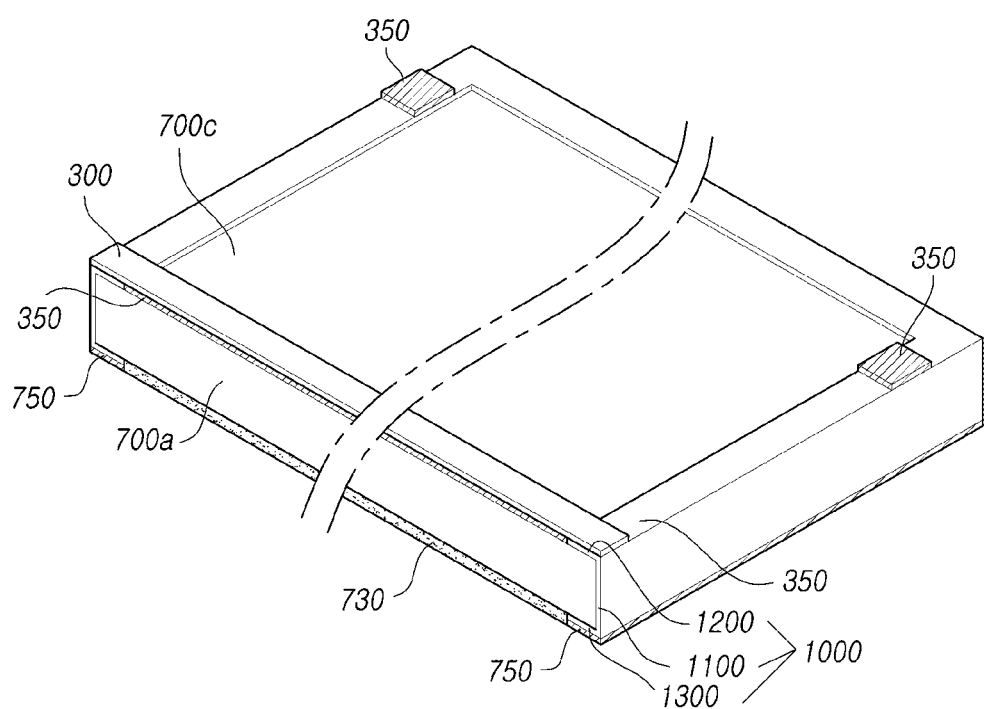
FIG. 6 is a perspective view illustrating the connection relationship between the light guide plate and a shielding member according to at least one embodiment of the present disclosure.

FIG. 4 is a cross-sectional view illustrating an external tape according to at least one embodiment of the present disclosure. FIG. 5 is a perspective view illustrating the connection relationship between a light guide plate and the external tape according to at least one embodiment of the present disclosure. FIG. 6 is a perspective view illustrating the connection relationship between the light guide plate and a shielding member according to at least one embodiment of the present disclosure.

Hereinafter, FIG. 4 through FIG. 6 will be described with reference to FIG. 1 through FIG. 3 in order to avoid repeated explanation and provide easy explanation.

Referring to FIG. 4 through FIG. 6, the external tape 1000 covers the entire lateral surface 700e and counter light-incident surface 700b of the light guide plate 700 and parts of the reflective surface 700d and the light-emitting surface 700c.

The external tape 1000 includes a reflective layer positioned in contact with the entire lateral surface 700e and counter light-incident surface 700b of the light guide plate 700 and the parts of the reflective surface 700d and the light-emitting surface 700c and a color coat layer 1070 covering the reflective layer 1050.

The reflective layer 1050 may be formed of at least any one of silver (Ag), aluminum (Al), titanium (Ti) and mixtures thereof. Specifically, when light incident into the light guide plate 700 is output toward the lateral surface 700e and the counter light-incident surface 700b of the light guide plate 700, the reflective layer 1050 reflects the light using the above-described reflective material and thus can increase the reflection efficiency.

If the reflective layer 1050 does not use the reflective material, light may be leaked through the lateral surface 700e and the counter light-incident surface 700b of the light guide plate 700, which may cause a decrease in light efficiency. Conventionally, a black resin is used for the lateral surface 700e and the counter light-incident surface 700b of the light guide plate 700 in order to suppress light leakage. However, the black resin can suppress light leakage but also absorbs light. Thus, the black resin is inefficient in terms of light efficiency.

The color coat layer 1070 may cover the reflective layer 1050. The color coat layer 1070 may be formed of a plastic material having flexibility. Further, the color coat layer 1070 may have a white color, a black color, or at least any one of a plurality of colors.

Since the reflective layer 1050 is present inside the color coat layer 1070, various colors may be used for the color coat layer 1070. The inside of the color coat layer 1070 refers to a direction of covering the light guide plate 700. Otherwise stated, the light output from the light guide plate 700 is reflected by the reflective layer 1050. Thus, various colors may be used for the color coat layer 1070.

Therefore, in the backlight unit 10 and the liquid crystal display device 1 having a backlight unit according to the present embodiment, the color coat layer 1070 can be designed using various colors. Thus, requirements for each user's personality can be satisfied and the quality satisfaction can be improved.

Referring now to FIG. 5, the external tape 1000 is defined by a first cover part 1100 in contact with the lateral surface 700e and the counter light-incident surface 700b of the light guide plate 700, a second cover part 1200 covering a part of the light-emitting surface 700c, and a third cover part 1300 covering a part of the reflective surface 700d.

Specifically, the first cover part 1100 in contact with the lateral surface 700e and the counter light-incident surface 700b of the light guide plate 700 may cover the whole surface of the lateral surface 700e and the counter light-incident surface 700b of the light guide plate 700. Further, the second cover part 1200 and the third cover part 1300 may cover a part of the light-emitting surface 700c and a part of the reflective surface 700d, respectively.

As such, the first cover part 1100, the second cover part 1200 and the third cover part 1300 cover the whole surface of the lateral surface 700e and the counter light-incident surface 700b of the light guide plate 700, a part of the light-emitting surface 700c and a part of the reflective surface 700d. Thus, light leaked to the outside from the inside of the light guide plate 700 can be reflected. In this manner, light loss may be minimized.

Herein, the second cover part 1200 and the third cover part 1300 may be of a thickness between 1 mm and 3 mm. Further, the first adhesive member 350 may be positioned to overlap with the second cover part 1200, and the second adhesive member 750 may be positioned to overlap with the third cover part 1300, and thus may be formed similar in shape to each other.

Herein, the relationship between the first adhesive member 350 and the second cover part 1200 is the same as the relationship between the second adhesive member 750 and the third cover part 1300. Therefore, the relationship between the second adhesive member 750 and the third cover part 1300 is described herein as a representative example.

If the second cover part 1200 and the third cover part 1300 are formed to a thickness of less than 1 mm, the second adhesive member 750 is highly likely to be formed greater than the third cover part 1300. Thus, the second adhesive member 750 may be seen in the active area, which is regarded as a defect.

Also, if the second cover part 1200 and the third cover part 1300 are formed to a thickness of more than 3 mm, the size of the active area may be reduced due to the second cover part 1200 and the third cover part 1300.

However, according to the present embodiment, the second adhesive member 750 is positioned to cover the third cover part 1300. Thus, the bezel area is reduced and the bonding strength between the glass cover 900 and the light guide plate 700 is enhanced.

As such, in the backlight unit 10 and the liquid crystal display device 1 having a backlight unit according to the present embodiment, the light efficiency of the backlight unit 10 may be increased and the manufacturing costs may be reduced by using the external tape 1000 to cover a lateral part of the light guide plate 700. Further, the bezel area may be reduced and the light efficiency of the backlight unit 10 may be increased using the external tape 1000. Thus, the luminance and power consumption of the liquid crystal display device 1 may be improved.

Referring now to FIG. 6, the first adhesive member 350 is positioned between the light guide plate 700 and the liquid crystal panel 200, and the first adhesive member 350 is positioned on the second cover part 1200.

Herein, the first adhesive member 350 that is positioned on the second cover part 1200 may be positioned on the whole surface or a partial area of the second cover part 1200. FIG. 6 illustrates an embodiment in which the first adhesive member 350 is positioned on a part of the second cover part 1200. Further, the second adhesive member 750 may be positioned to overlap with a partial surface or the whole surface of the third cover part 1300.

As such, if the first adhesive member 350 is positioned on a part of the second cover part 1200, only a part of the first adhesive member 350 may be formed. Thus, the cost of materials can be reduced. Also, since the first adhesive member 350 is formed on only a part of the second cover part 1200, the workability can be improved.

Therefore, in the backlight unit 10 and the liquid crystal display device 1 having a backlight unit according to the present embodiment, the first adhesive member 350 is positioned between the light guide plate 700 and the liquid crystal panel 200. Thus, the bonding strength between the light guide plate 700 and the liquid crystal panel 200 can be enhanced.

Also, the first adhesive member 350 may be positioned on a part of the light-emitting surface 700c adjacent to the liquid crystal panel 200 and the light-incident surface 700c of the light guide plate 700. Further, the shielding member 300 may be positioned on the first adhesive member 350 and positioned on a part of the light-emitting surface 700c adjacent to the liquid crystal panel 200 and the light-incident surface 700c of the light guide plate 700.

Herein, the first adhesive member 350 positioned on a part of the light-emitting surface 700c adjacent to the liquid crystal panel 200 and the light-incident surface 700c of the light guide plate 700 can enhance the bonding strength between the shielding member 300 and the light guide plate 700.

Further, the shielding member 300 can shield light emitted from the light source package 600 and leaked toward the first adhesive member 350 due to the first adhesive member 350 positioned on a part of the light-emitting surface 700c adjacent to the liquid crystal panel 200 and the light-incident surface 700c of the light guide plate 700.

That is, a screen adjacent to the light-incident surface 700a of the light guide plate 700 may have a relatively high luminance due to light leakage. Thus, its surrounding area may be seen darker, and such a phenomenon can be minimized by the shielding member 300.

Accordingly, in the backlight unit 10 and the liquid crystal display device 1 having a backlight unit according to the present embodiment, the shielding member 300 is positioned in the area where the first adhesive member 350 is positioned to shield light leaked through the first adhesive member 350. Therefore, the light efficiency can be increased and power consumption can be improved.

Figure 7:
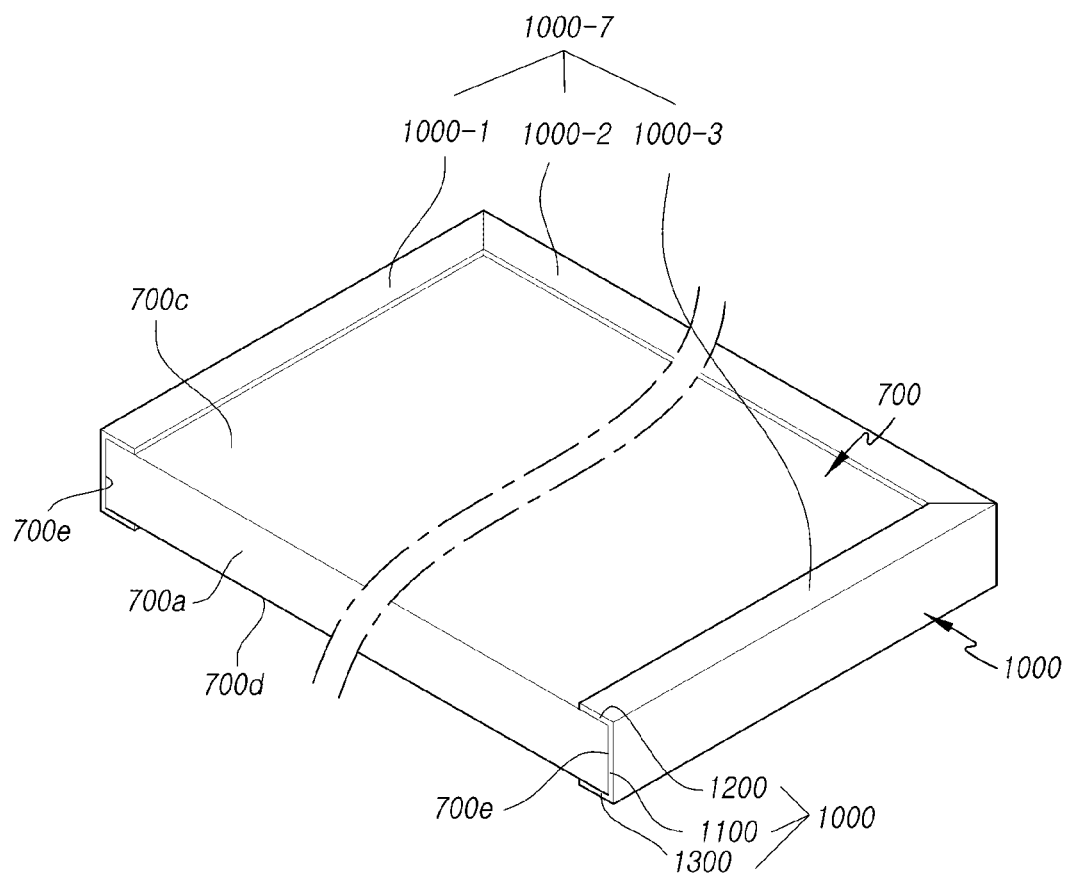
FIG. 7 is a perspective view illustrating a part of a backlight unit according to another embodiment of the present disclosure.

FIG. 7 is a perspective view illustrating a part of a backlight unit according to another embodiment of the present disclosure.

Hereinafter, FIG. 7 is described with reference to FIG. 1 through FIG. 6 in order to avoid repeated explanation and provide easy explanation.

Referring to FIG. 7, a backlight unit 10-7 includes the light guide plate 700 and an external tape 1000-7 that covers a part of the light guide plate 700. Herein, the external tape 1000-7 may include a first external tape 1000-1 positioned on the first lateral surface 700e of the light guide plate 700, a second external tape 1000-2 positioned on the counter light-incident surface 700b of the light guide plate 700, and a third external tape 1000-3 positioned on the second lateral surface 700e of the light guide plate 700. The first external tape 1000-1, the second external tape 1000-2, and the third external tape 1000-3 may be positioned independently from each other.

In the above-described embodiment, it is described that the first external tape 1000-1, the second external tape 1000-2, and the third external tape 1000-3 are formed as one body. However, in the present embodiment, it is described that the first external tape 1000-1, the second external tape 1000-2, and the third external tape 1000-3 are formed independently from each other.

The external tape 1000-7 including the first external tape 1000-1, the second external tape 1000-2, and the third external tape 1000-3 positioned independently from each other can be easily installed on the light guide plate 700 and thus improves the workability. Further, the external tape 1000-7 can be easily handled and thus is more suitable for mass production.

As such, in the backlight unit and the liquid crystal display device having a backlight unit according to another embodiment of the present disclosure, the light efficiency of the backlight unit may be increased and the manufacturing costs may be reduced by using the external tape 1000-7 covering a lateral part of the light guide plate 700. Further, the bezel area may be reduced and the light efficiency of the backlight unit may be increased by using the external tape 1000-7. Thus, the luminance and power consumption of the liquid crystal display device may be improved.

The above descriptions are provided only for illustration of the technical concept of the present disclosure, and it would be understood by those skilled in the art that various changes and modifications may be made without changing essential features of the present disclosure. Therefore, the embodiments of the present disclosure are provided for illustrative purposes only but not intended to limit the technical concept of the present disclosure. The scope of the technical concept of the present disclosure is not limited thereto. The protective scope of the present disclosure should be construed based on the following claims, and all the technical concepts in the equivalent scope thereof should be construed as falling within the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A backlight unit, comprising:
    a light guide plate having a light-incident surface, lateral surfaces, an upper surface, and a lower surface;
    a light source assembly positioned adjacent to the light-incident surface of the light guide plate;
    an external tape having a dual-layer, including:
        a reflective layer directly contacting the light guide plate; and
        a color coat layer positioned on the reflective layer, wherein the reflective layer includes three outer surfaces that face the color coat layer, and the color coat layer directly contacts the three outer surfaces of the reflective layer,
        wherein the reflective layer of the external tape directly contacts the lateral surfaces of the light guide plate and directly contacts parts of the upper surface and the lower surface of the light guide plate;
    a first adhesive member on the color coat layer, and further positioned between the light guide plate and a liquid crystal panel;
    a glass cover that interfaces with the lower surface of the light guide plate;
    a reflector positioned between the light guide plate and the glass cover; and
    a second adhesive member positioned between the light guide plate and the glass cover, the second adhesive member overlapping with the external tape covering the part of the lower surface of the light guide plate,
    wherein parts of the reflective layer that are directly contacting the upper surface, the lower surface, and the lateral surface between the upper surface and the lower surface of the light guide plate are formed integrally, and
    wherein the glass cover has a black print layer positioned between the reflector and the glass cover.

2. The backlight unit according to claim 1, wherein the external tape is independently positioned corresponding to the lateral surfaces except the light-incident surface.

3. The backlight unit according to claim 1, wherein the reflective layer is formed of at least any one of silver (Ag), aluminum (Al), titanium (Ti), and mixtures thereof.

4. The backlight unit according to claim 1, further comprising:
    a black cover layer that covers a lateral surface of the glass cover adjacent to the light source assembly and parts of an upper surface and a lower surface of the glass cover.

5. The backlight unit according to claim 4, further comprising:
    a reflective tape positioned between the light guide plate and the black cover layer, the reflective tape overlapping the black cover layer.

6. The backlight unit according to claim 1, wherein the second adhesive member and the external tape covering the part of the lower surface of the light guide plate have a thickness between 1 mm and 3 mm.

7. The backlight unit according to claim 1, wherein the black print layer is positioned on an area where the second adhesive member is not disposed.

8. A liquid crystal display device, comprising:
    a backlight unit that includes a light guide plate, a light source assembly positioned adjacent to a light-incident surface among lateral surfaces of the light guide plate, and an external tape directly contacting the lateral surfaces of the light guide plate not covering the light-incident surface, and directly contacting parts of an upper surface and a lower surface of the light guide plate, wherein the external tape includes a reflective layer and a color coat layer positioned on the reflective layer;

a liquid crystal panel positioned on the backlight unit; and an adhesive member positioned on the color coat layer and positioned between the light guide plate and the liquid crystal panel, wherein the reflective layer directly contacts lateral surfaces of the light guide plate and the parts of the upper surface and the lower surface of the light guide plate, wherein parts of the reflective layer that are directly contacting the upper surface, the lower surface, and the lateral surface between the upper and lower surfaces of the light guide plate are formed integrally, wherein the reflective layer further includes three outer surfaces, and the color coat layer directly contacts the three outer surfaces of the reflective layer, and wherein the backlight unit further comprises:
  a glass cover that interfaces with the lower surface of the light guide plate;
  a reflector positioned between the light guide plate and the glass cover; and
  a second adhesive member positioned between the light guide plate and the glass cover, the second adhesive member overlapping with the external tape covering the part of the lower surface of the light guide plate, and
wherein the glass cover has a black print layer positioned between the reflector and the glass cover.

9. The liquid crystal display device according to claim 8, wherein the adhesive member overlaps with the external tape covering the parts of the upper surface and the lower surface of the light guide plate.

10. The liquid crystal display device according to claim 8, further comprising:
  a shielding member positioned on an edge of the upper surface adjacent to the light-incident surface of the light guide plate.

11. The liquid crystal display device according to claim 8, further comprising:
  a top cover that covers a lateral surface of the backlight unit at the light source assembly and an edge of an upper surface of the liquid crystal panel that overlaps with the light source assembly.

12. A backlight unit, comprising:
  a light guide plate having a light-emitting surface, a reflective surface, a first light-incident surface, a second light-incident surface, and lateral surfaces, the first light-incident surface being opposite of the second light-incident surface;
  a light source assembly positioned adjacent to the first light-incident surface of the light guide plate;
  an external tape covers the lateral surfaces, the light-emitting surface, the reflective surface, and the second light-incident surface of the light guide plate and does not cover the first light-incident surface;
  a first adhesive member positioned between the light guide plate and a liquid crystal panel;
  a glass cover that interfaces with the reflective surface of the light guide plate;
  a reflector positioned between the light plate and the glass cover; and
  a second adhesive member positioned between the light guide plate and the glass cover, the second adhesive member overlapping with the external tape covering the part of the lower surface of the light guide plate,
wherein the external tape includes a reflective layer and a color coat layer positioned on the reflective layer,
wherein the color coat layer contacts the first adhesive member,
wherein parts of the reflective layer directly contact the lateral surfaces, the light-emitting surface, the reflective surface, and the second light-incident surface between the light-emitting surface and the reflective surface of the light guide plate, and the parts of the reflective layer are formed integrally, and
wherein the reflective layer further includes three outer surfaces that face the color coat layer, and the color coat layer directly contacts the three outer surfaces of the reflective layer, and
wherein the glass cover has a black print layer positioned between the reflector and the glass cover.

13. The backlight unit according to claim 12, further comprising:
  a black cover layer that covers a lateral surface of the glass cover adjacent to the light source assembly, parts of an upper surface, and a lower surface of the glass cover.

14. The backlight unit according to claim 13, further comprising:
  a reflective tape positioned between the light guide plate and the black cover layer, the reflective tape overlapping the black cover layer.

* * * * *

UNITED STATES PATENT AND TRADEMARK OFFICE
CERTIFICATE OF CORRECTION

PATENT NO.         : 10,884,178 B2
APPLICATION NO.    : 15/716227
DATED              : January 5, 2021
INVENTOR(S)        : Jinho Kim et al.

Page 1 of 1

It is certified that error appears in the above-identified patent and that said Letters Patent is hereby corrected as shown below:

In the Claims

Column 16, Line 32:
"integrally, and" should read: --integrally,--.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*